United States Patent
Vogel et al.

(10) Patent No.: US 10,248,733 B2
(45) Date of Patent: Apr. 2, 2019

(54) INTEGRATION OF A CATALOG APPLICATION WITH A MONITORING APPLICATION

(71) Applicant: SAP SE, Walldorf (DE)

(72) Inventors: Andreas Vogel, Rauenberg (DE); Andreas Kunstein, Rauenberg (DE); Dominic Hehn, Speyer (DE); Mathias Zietzschmann, Wiesloch (DE); Michael Decker, Graben-Neudorf (DE); Sigo Henkel, Heidelberg (DE); Steffen Maier, Mauer (DE); Susanne Gottlieb, Karlsruhe (DE)

(73) Assignee: SAP SE, Walldorf (DE)

( * ) Notice: Subject to any disclaimer, the term of this patent is extended or adjusted under 35 U.S.C. 154(b) by 384 days.

(21) Appl. No.: 14/961,960

(22) Filed: Dec. 8, 2015

(65) Prior Publication Data

US 2017/0161058 A1 Jun. 8, 2017

(51) Int. Cl.
*G06F 17/30* (2006.01)
*G06F 8/71* (2018.01)

(52) U.S. Cl.
CPC ......... *G06F 17/3089* (2013.01); *G06F 8/71* (2013.01); *G06F 17/30554* (2013.01)

(58) Field of Classification Search
CPC .......... G06F 17/3089; G06F 17/30554; G06F 17/30566; G06F 17/30893
USPC ....................................... 707/769
See application file for complete search history.

(56) References Cited

U.S. PATENT DOCUMENTS

| | | | | |
|---|---|---|---|---|
| 2002/0198985 | A1* | 12/2002 | Fraenkel | G06F 11/3409 709/224 |
| 2004/0249867 | A1* | 12/2004 | Kraiss | G06F 9/44536 |
| 2006/0235778 | A1* | 10/2006 | Razvi | G06Q 10/10 705/35 |
| 2010/0274596 | A1* | 10/2010 | Grace | G06Q 10/063114 705/7.15 |
| 2012/0029977 | A1* | 2/2012 | Alcorn | G06Q 10/06393 705/7.39 |

* cited by examiner

*Primary Examiner* — Thu Nguyet T Le
(74) *Attorney, Agent, or Firm* — Buckley, Maschoff & Talwalkar LLC (57) ABSTRACT

A catalog application includes data for key indicators for performance measurement of applications. The catalog application comprises data for a large number of key indicators that may be compatible for different application. A monitoring application utilizes data for key indicators to measure performance of external applications. A catalog service interface is instantiated to process requests from the monitoring application to the catalog application. The external applications run in different technical environments and are part of different technical landscapes. A request to provide data for key indicators compatible with a first application is received at the instantiated service interface. The key indicators in the catalog application are filtered based on matching the technical characteristics of the first application with the key indicators' prerequisites. The data for the compatible key indicators is provided through invoking a user interface of the catalog application for display within the measuring application.

20 Claims, 10 Drawing Sheets

INTEGRATION OF A CATALOG APPLICATION WITH A MONITORING APPLICATION

BACKGROUND

Key performance indicators (KPIs) are factors that are defined for benchmarking or monitoring performance of organizations, businesses, hardware and/or software systems, etc. KPIs are defined and associated with objectives and goals. KPIs provide performance information that may be used by organizations or other stakeholders to understand whether targeted outcomes are achieved according to plan. A KPI defines a set of measurement criteria, based on which an accomplishment or a failure may be determined. KPI's measurement criteria may be performed in different scenarios and may be associated not only with organizational performance, but also with performance of computer systems and application. For example, some KPIs may be defined for business process analytics and/or business process monitoring.

Data may be collected to measure KPIs in order to gain insights and provide information to a decision-making process. Data and KPIs are essential tools that serve as useful indicators of how well a software system or application progresses and complies with a set goal. KPIs can also vary from application to application or a software system to a software system. Data may be interpreted as a "raw material" that feeds KPIs' measurement and that allows performing of data analysis. The data includes values (or measurements) that can be quantitative or qualitative by nature. Data may be generated in different formats, e.g. numerical, textual, or even graphical or visual. Respectfully, data can be collected in different ways, both automatically or manually. For example, data is collected automatically via sensors, or manually via providing surveys. Further, data may be collected through specific configurations defined on selected software systems that determine what type of data to be collected in order to measure a particular KPI.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for integrating a catalog application into a monitoring application are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
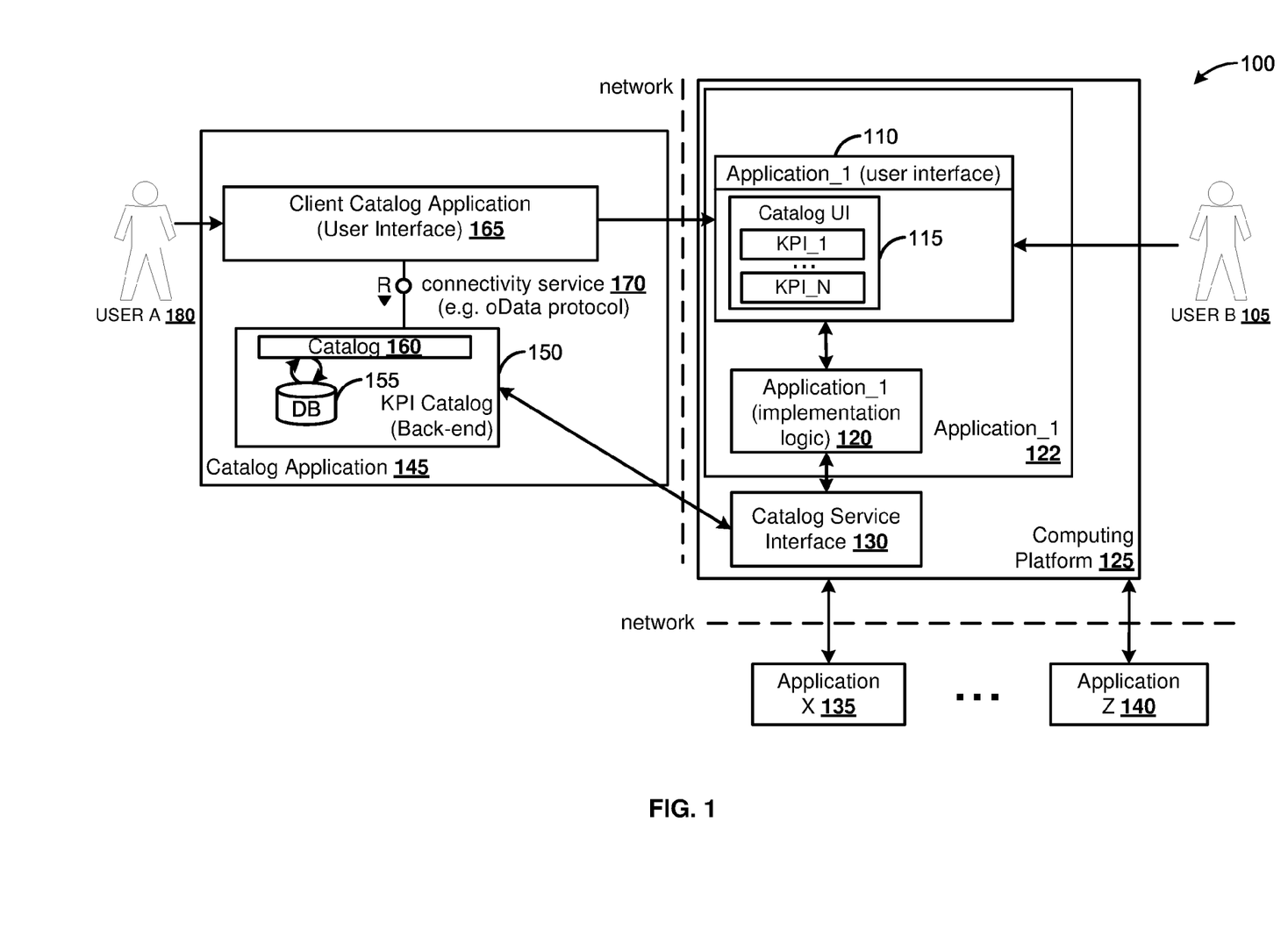
FIG. 1 is a block diagram illustrating a system environment for integrating a catalog application into a monitoring application for performance measurement of applications, according to one embodiment.

FIG. 1 is a block diagram illustrating a system environment 100 for integrating catalog application 145 into a monitoring application for performance measurement of applications, according to one embodiment. The catalog application 145 may be a KPI application that stores and provides information and data. The providing of data from the catalog application 145 may be associated with different key indicators that are defined correspondingly for a number of software applications. One key indicator may be compatible with more than one software application. There may be a mapping defining a matching compatibility between a key indicator and a software application. The key indicator defines rules for measuring performance based on stored data for the performance of a software application.

In one embodiment, the catalog application 145 comprises a back-end part including implementation logic—KPI Catalog (Back-end) 150. Further, the catalog application 145 comprises a user interface (UI) part, which is client catalog application (UI) 165. The client catalog application (UI) 165 is a UI application that displays catalog content in a browser, such as a web browser. The client catalog application (UI) 165 may receive requests from a user, such as user A 180. The request may be for searching for particular key indicators, based on search criteria. For example, key indicators may be searched by name, or by an applicable area. The KPI Catalog (Back-end) 150 includes catalog 160, where large parts of the application logic are implemented. The client catalog application (UI) 165 communicates with the catalog 160. The catalog 160 is the application layer of the catalog application 145. The client catalog application 165 communicates with the catalog 160 through a connectivity service 170. The connectivity service 170 may allow communication over an Open Data protocol (oData protocol). In one embodiment, there may be parts of the application logic of the Catalog application 145 that are implemented on a database (DB) 155. The DB 155 may be an in-memory database. For example, searching functionality may be integrated into the DB 155. The catalog application 145 may provide a searching function. The catalog 160 may invoke searching logic, implemented in the database 155, to provide results on the client catalog application (UI) 165.

The DB 155 provides persistence of content of the catalog application 145. The DB 155 may store the content in a set of tables. The catalog 160 may define logic for storing and organizing information and data associated with the key indicators. The catalog 160 may use a predefined template for organizing data associated to the key indicators. The predefined template may be used whenever a request to add data for a new key indicator is received by the catalog application 145. The persisted content in the DB 155 may be associated with the key indicators and may include descriptions of the key indicators, technical prerequisites of the key indicators, specific configuration instructions associated with measurement of the key indicators, etc. The DB 155 may also comprise configuration instances associated correspondingly with the key indicators that may be provided for downloading. A downloaded configuration instance may be installed on a monitoring application for performance measurement of a monitored application. Measurements over the performance of the monitored application are computed, as defined in the key indicator. The measurement may be configured automatically from the configuration instance.

In one embodiment, user B 105 interacts with an Application_1 122. User B 105 communicates with an Application_1 (User Interface) 110, which is a UI of the Application_1 122. The Application_1 runs on a computing platform 125. For example, the computing platform 125 may be a platform for application lifecycle management. The Application_1 (implementation logic) 120 consumes the computing resources provided by the computing platform 125. The Application_1 122 may be a monitoring application that is associated with a set of other software applications and/or systems. The associated systems may be such as Application X 135 through Application Z 140. The associated systems may be software systems that may run on other computing platforms and utilize different computing and runtime infrastructure compared to the Application_1 122. For example, the Application X 135 may be an on-premise Enterprise Resource Planning (ERP) system that runs on a particular platform, communicates with a certain type of a database and other applications running on the platform. The Application X 135 exists in a technical landscape together with other applications, where specific software and hardware characteristics and parameters are defined. The Application Z 140 may be an on-demand Customer Relationship Management (CRM) application, which runs on a different platform infrastructure compared to the Application X 135. The Application Z 140 runs in a different technical landscape, with specific software and hardware characteristics and parameters. The computing platform 125 may communicate with the Application X 135 and/or the Application Z 135. The measurement of specific performance parameters defined for a given key indicator may be performed by the Application_1 122. The measurements may be configured, for example, for the Application X 135, or for the Application Z 135.

In one embodiment, the Application_1 122 receives a request from the user B 105 to provide information about available key indicators for performance measurement of Application X 135. Based on the received request, the Application_1 122 communicates with an instantiated catalog service interface 130. The catalog service interface 130 is instantiated on the Computing Platform 125 to serve requests sent by applications running on the Computing Platform 125 to the catalog application 145. The Application_1 122 asks the catalog service interface 130 to provide a view of content for key indicators from the catalog application 145. The Application_1 122 requests through the client catalog application (UI) 165 to display content included in the catalog application 145 for key indicators compatible with the Application X 135. The Application_1 122 may ask for a Uniform Resource Locator (URL) referencing to the client catalog application (UI) 165. The Application_1 122 opens a browser window. A request is sent to the client catalog application (UI) 165 to display data for compatible key indicators with the Application X 135, persisted in the catalog application 145. The Client catalog application (UI) 165 is displayed within the Application_1 (UI) 110 of the Application_1 122. Catalog UI 115 is invoked in the Application_1 (UI) 110. The catalog UI 115 is generated based on the client catalog application (UI) 165 and provides a view of content of the catalog application 145. The catalog UI 115 includes data for different key indicators that are applicable and respectfully compatible with the Application X 135. From the invoked client catalog application (UI) 165, a filtered list of the entire maintained list of key indicators by the catalog application 145, is provided. Based on the provided filtered list within the Application_1 (UI) 110, a selection of a key indicator may be made. When the Application_1 122 receives a request for providing data associated with a selected key indicator, the Application_1 122 asks the catalog service Interface 130 for the requested data. Then the catalog service interface 130 requests the data for the key indicator from the catalog application 145.

Figure 2:
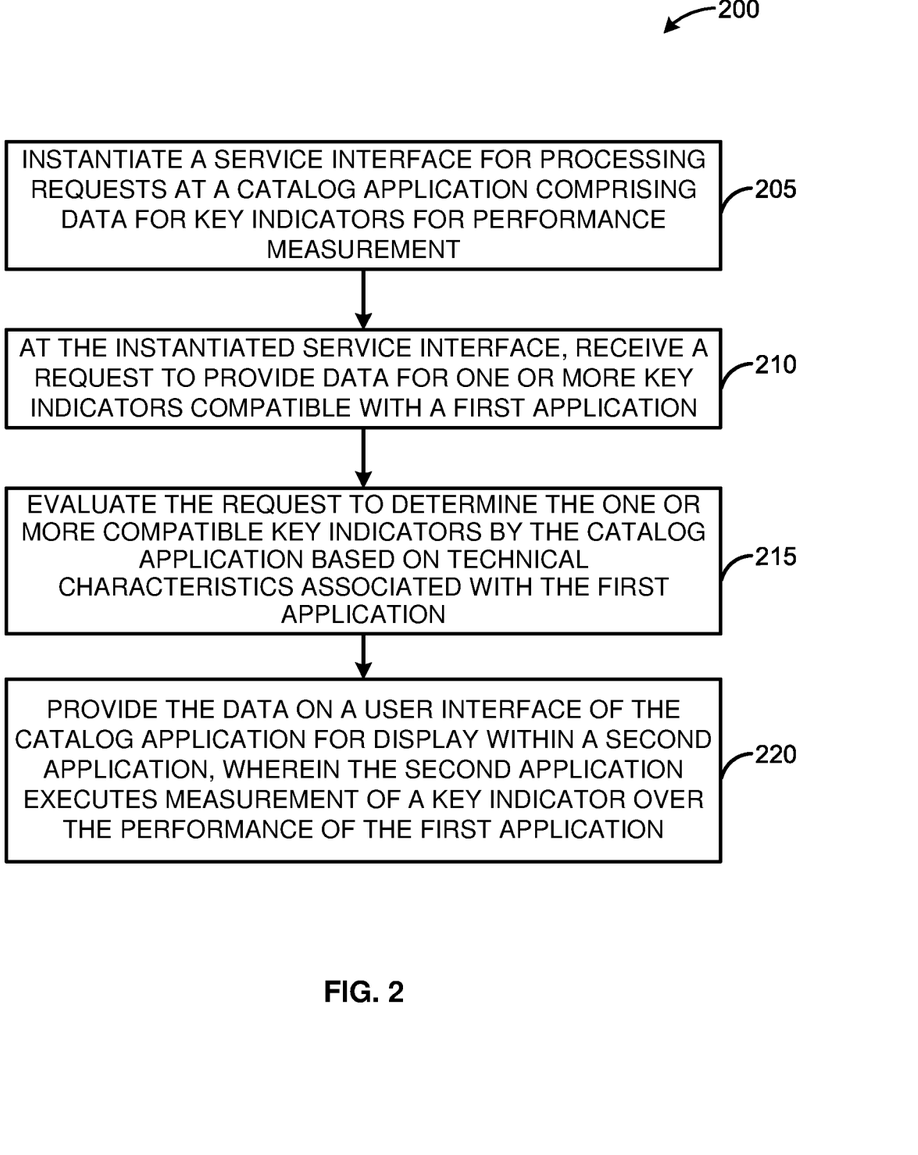
FIG. 2 is a flow diagram illustrating a process for providing data from a catalog application within a monitoring application, according to one embodiment.

FIG. 2 is a flow diagram illustrating a process 200 for providing data from a catalog application within a monitoring application, according to one embodiment. The catalog application may be such as the catalog application 145, FIG. 1. At 205, a service interface is instantiated for processing requests at the catalog application. The service interface provides the requests from the monitoring application to the catalog application. The service interface may be such as the catalog service interface 130 that is instantiated on the computing platform 125 in FIG. 1. The catalog application comprises data for key indicators for performance measurements of applications. The service interface may be instantiated on a platform where the monitoring application may utilize the information and data for key indicators, and then measure performance of external applications. The external applications may run in different technical environments and may be part of different technical landscapes. At 210, at the instantiated service interface, a request to provide data for one or more key indicators compatible with a first application is received. The request may be sent by a monitoring application that may measure the performance of the first application based on the provided data. The monitoring application may be such as Application_1 122, FIG. 1. The catalog application may comprise data for a large number of key indicators that may be applicable with different applications. The catalog application stores data for key indicators and defines technical details for configuring the measurement in regards to a specific application that may use the configurations. A key indicator may be compatible with more than one application. At 215, the request is evaluated to determine the one or more compatible key indicators from the catalog application based on technical characteristics associated with the first application. The key indicators in the catalog application are defined with descriptions, technical details, configurable instances ready for installation, and technical prerequisites. The key indicators in the catalog application are filtered based on matching the technical characteristic of the first application with the key indicators' prerequisites. At 220, the data about the one or more key indicators is provided on a user interface of the catalog application for display within a second application. The UI of the catalog application may be invoked by the instantiated service interface. The second application may be the application sending the request at 210. The second application may be a monitoring application. For example, the second application may be such as the Application_1 122, and the first application may be such as the Application X 135.

Figure 3:
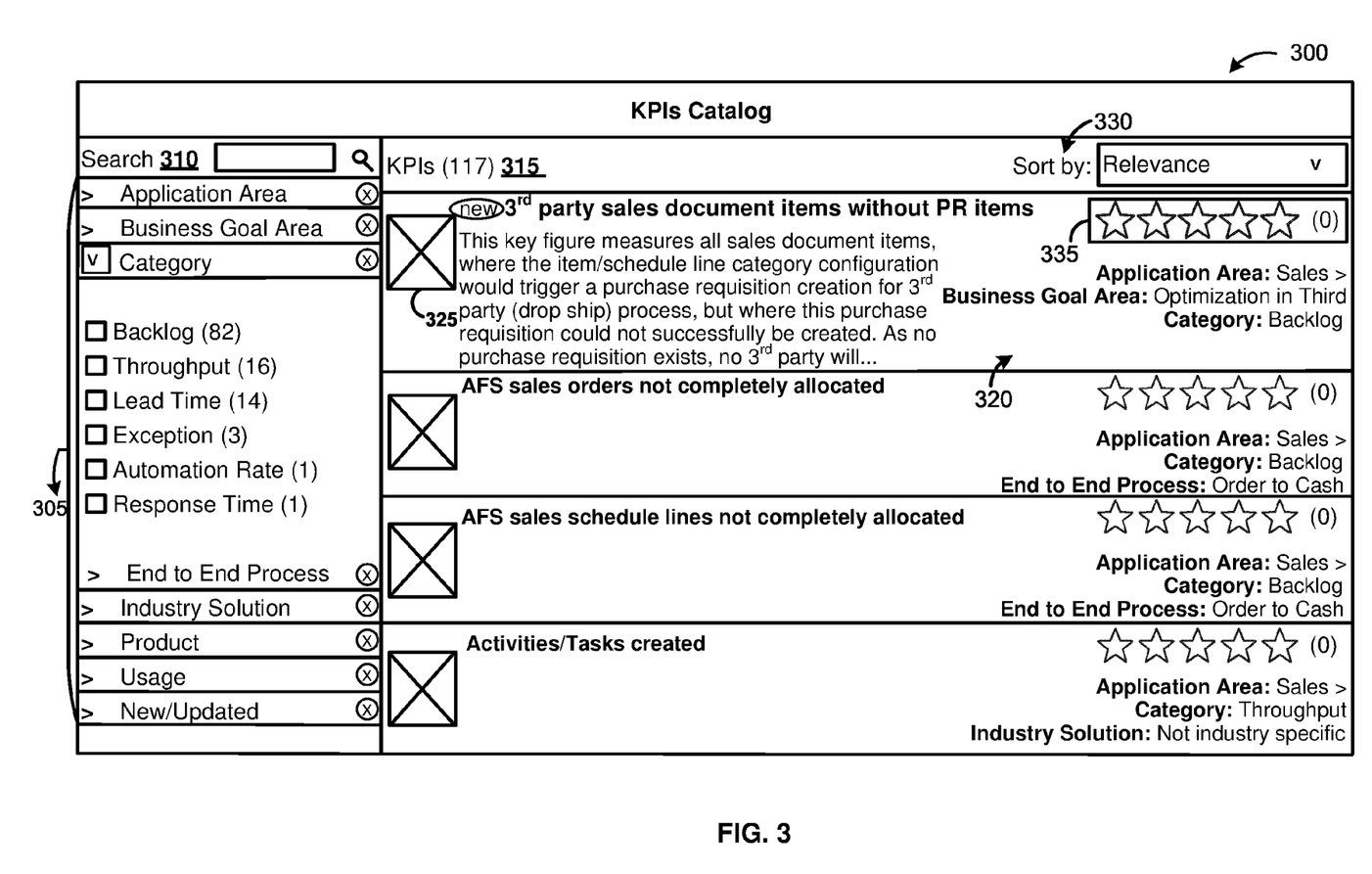
FIG. 3 is a block diagram illustrating a screenshot from a user interface of a catalog application providing data for defined key indicators, according to one embodiment.

FIG. 3 is a block diagram illustrating a screenshot 300 from a user interface of a catalog application providing data for defined key indicators, according to one embodiment. The catalog application may be such as the Catalog Application 145, FIG. 1. At screenshot 300, at block area KPI (117) 315, a number of key indicators are presented together with data descriptions. The key indicators may be allocated to groups based on an association between a key indicator and an applicable area for measurement. Key indicators are divided into groups, as suggested in section 305. A key indicator may be presented as part of more than one group. The groups may be such as application area, business goal area, category, product, etc. A group from the set of groups presented in section 305 may be further divided into additional subgroups. As suggested for group "Category", the subgroups include Backlog, Throughput, Lead Time, etc. For example, the listed key indicators may be the indicators that are stored by the catalog application. In another example, the listed key indicators may be only key indicators that are compatible with a particular application, as suggested in relation to FIG. 2. The catalog application may provide searching options, for example through Search 310 functionality on the screen 300. In addition, an option for sorting the displayed list of KPIs in the block area KPI (117) 315 is provided. Through a sorting option—"Sort by" 330, the key indicators may be sorted according to a sorting criterion. For example, key indicators may be sorted according to relevance, entry data, alphabetic order, etc.

In one embodiment, a key indicator may be presented on the screenshot 300 with associated data. For example, key indicator 320—"$3^{rd}$ party sales document items without purchase request (PR) items" may be presented together with a brief textual description, and a visual icon may be put in a currently empty UI box 325. The key indicator 320—"$3^{rd}$ party sales document items without PR items" may be a new key indicator added in the catalog application. The key indicator 320—"$3^{rd}$ party sales document items without PR items" may be assigned with a rating score 335. The rating score 335 may be defined by users that communicate with the catalog application, such as end users, administrators, developers, etc. The rating score may be provided on a predefined scale. In the current example, the key indicator 320—"$3^{rd}$ party sales document items without PR items" is not rated by a user, and the rating score 335 is "0", on the scale from 0 to 5. The rating score 335 may be presented with a numerical value. The presentation of the rating score 335 may also be accompanied by a visual presentation of stars that reflect the determined rating score. In one embodiment, the block area KPIs (117) 315 may be presented as a sorted list according to defined rating scores for the key indicators. The key indicator 320—"$3^{rd}$ party sales document items without PR items" is associated with three groups, as defined in the section 320—application area, business goal area, and category.

Figure 4A:
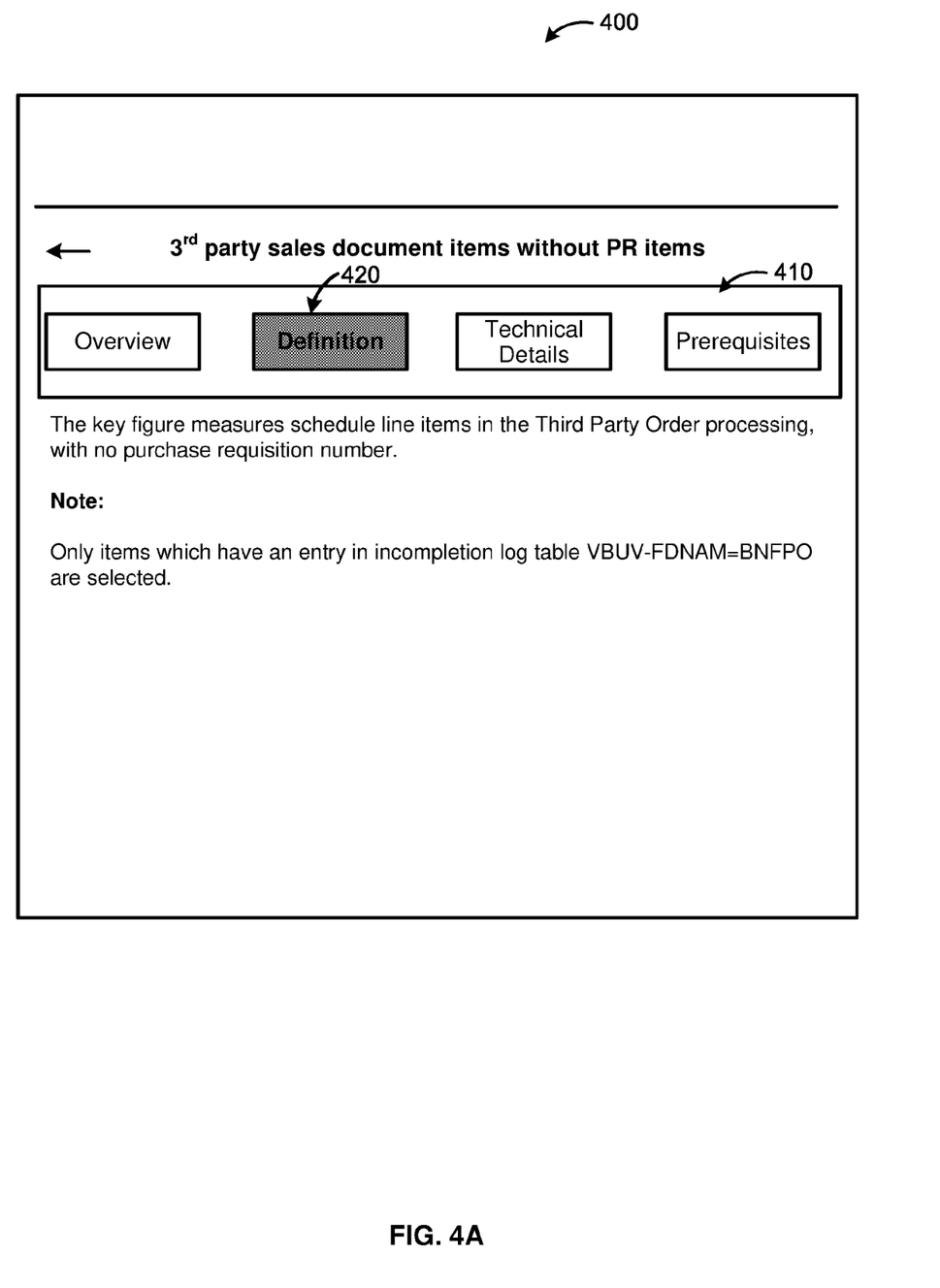
FIG. 4A is a block diagram illustrating a screenshot from a user interface of a catalog application providing general data for a key indicator, according to one embodiment.

FIG. 4A is a block diagram illustrating a screenshot 400 from a user interface of a catalog application providing general data for a key indicator, according to one embodiment. The catalog application may be such as the Catalog Application 145, FIG. 1 and the catalog application discussed in relation to FIG. 3. The suggested UI of the catalog application (presented on FIG. 3), may also provide options to display detailed information about a selected key indicator. The screenshot 400 presents detailed information for a selected key indicator, particularly, key indicator 320—"3rd party sales document items without PR items", discussed at FIG. 3. The key indicator 320 is in the sales application area and is associated with optimization of processes related to interaction with third parties. The screenshot 400 includes a menu 410 for selecting different part of data associated with the key indicator. The menu 410 includes four selection options—"Overview", "Definition", "Technical Details", and "Prerequisites". The menu 410 may further include other additional parts comprising further details related to the key indicator. For example, such additional selection options may be related to defined thresholds, usage, calculations, versions, etc. The data provided in the different sections includes different aspects of the key indicator 320. The data may include a general overview, a definition, technical details for the manner of performing measurements, and prerequisites for the key indicator. The provided data is related to details about computing a performance measurement over a particular application. The section "Definition" 420 is selected on the screenshot 400. When selecting the option "Definition", data associated with a definition of what is measured for the selected key indicator is provided. The key indicator 320—"3rd party sales document items without PR items" is defined to measure scheduled line items in a Third Party Order processing, with no purchase requisition number.

Figure 4B:
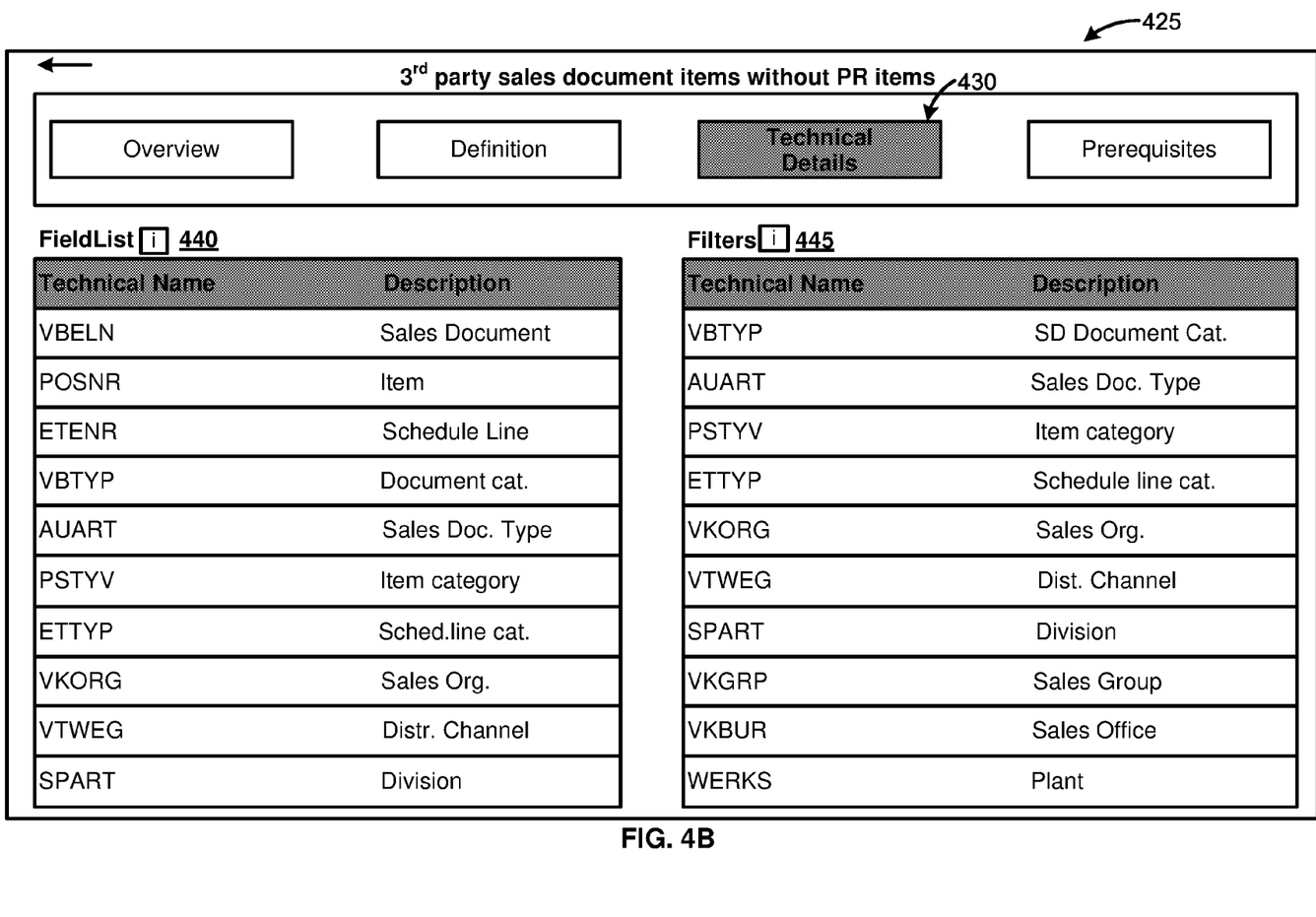
FIG. 4B is a block diagram illustrating a screenshot from a user interface of a catalog application providing technical details for a key indicator, according to one embodiment.

FIG. 4B is a block diagram illustrating a screenshot 425 from a user interface of a catalog application providing technical details for a key indicator, according to one embodiment. The catalog application may be such as the catalog application 145, FIG. 1. The screenshot 425 may be associated with the screenshot 400 from FIG. 4A, and may include technical details in relation to a key indicator, such as the key indicator 320—"3rd party sales document items without PR items" (discussed in relation to FIG. 3 and FIG. 4A). A "Technical Details" 430 section may be selected from the menu 410, FIG. 4A, and information about how data stored by a monitored application is aggregated and analyzed to determine a measurement for the key indicator 320. At "FieldList" section 440, a list of fields is presented together with descriptions. When a given key indicator is measured, data stored for the monitored application may be accessed and evaluated. Based on the definition of the key indicator, different parts of the stored data for the monitored application may be used. The monitored application may be such as the Application X 135, FIG. 1. There is stored data for the monitored application related to the application's performance in tables, which are part of databases. Collected data in such tables is accessed and evaluated in order to measure a key indicator, such as the key indicator 320. The data may be collected within the technical landscape of the monitored application. For example, data may be collected on a computing infrastructure, where the monitored application runs. The collected data is accessible by a monitoring application, such as Application_1 122, FIG. 1. For key indicator 320, as defined in screenshot 425, fields related to sales documents, items from the sales documents, document categories, etc. are part of existing tables, where data related to the monitored application is stored. Additionally, at "Filters" 445 section, a list of defined filters on data stored in relation to the monitored application are defined.

Figure 4C:
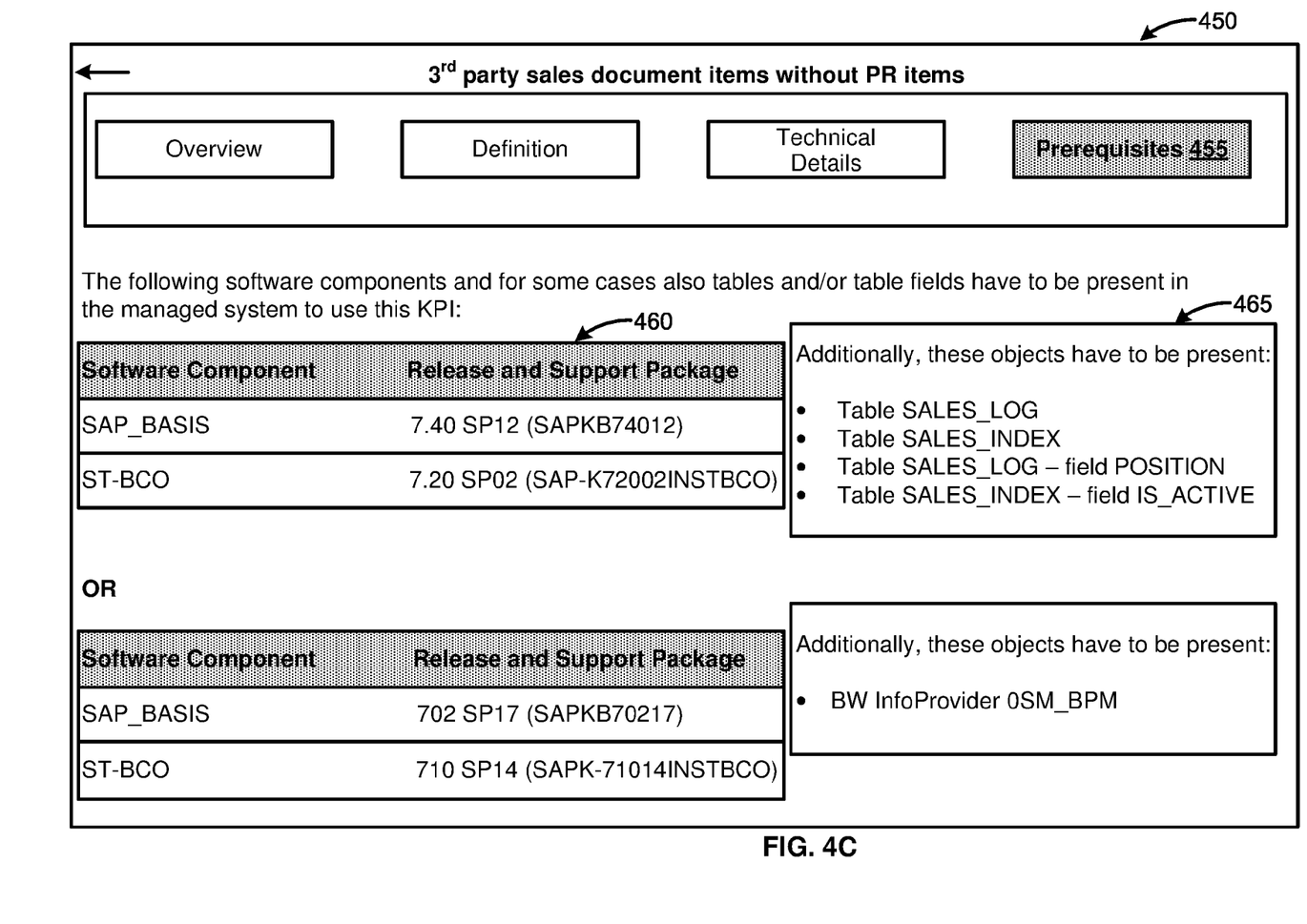
FIG. 4C is a block diagram illustrating a screenshot from a user interface of a catalog application providing information for defined prerequisites associated with a key indicator, according to one embodiment.

FIG. 4C is a block diagram illustrating a screenshot 450 from a user interface of a catalog application providing information for defined prerequisites associated with a key indicator, according to one embodiment. The catalog application may be such as the catalog application 145, FIG. 1. The screenshot 450 may be associated with the screenshot 400 from FIG. 4A and the screenshot 425 from FIG. 4B. The screenshot 450 may include data associated with prerequisites for a key indicator, such as the key indicator 320—"3rd party sales document items without PR items", discussed in relation to FIG. 3. A "Prerequisites" 455 section is selected. The "Prerequisites" 455 section includes a list of applications that may be monitored by the key indicator. Further, the "Prerequisites" 455 section provides a definition of required software components from a monitored application in order to apply a performance measurement according to the defined key indicator 320—"3rd party sales document items without PR items". Required versions or identification numbers of the requirement software components may be specified. For example, the required software components, together with related release versions and support packages may be defined as in block 460. Additional requirements over the monitored application may be defined. The additional requirements may include requirements for presence of tables, where performance data for the monitored application are stored. Also, the additional requirements may define a requirement for a particular field in the required tables. At block 465, the additional requirements define two required tables. In block 465, for part of the tables, a field is correspondingly specified as required.

Figure 5:
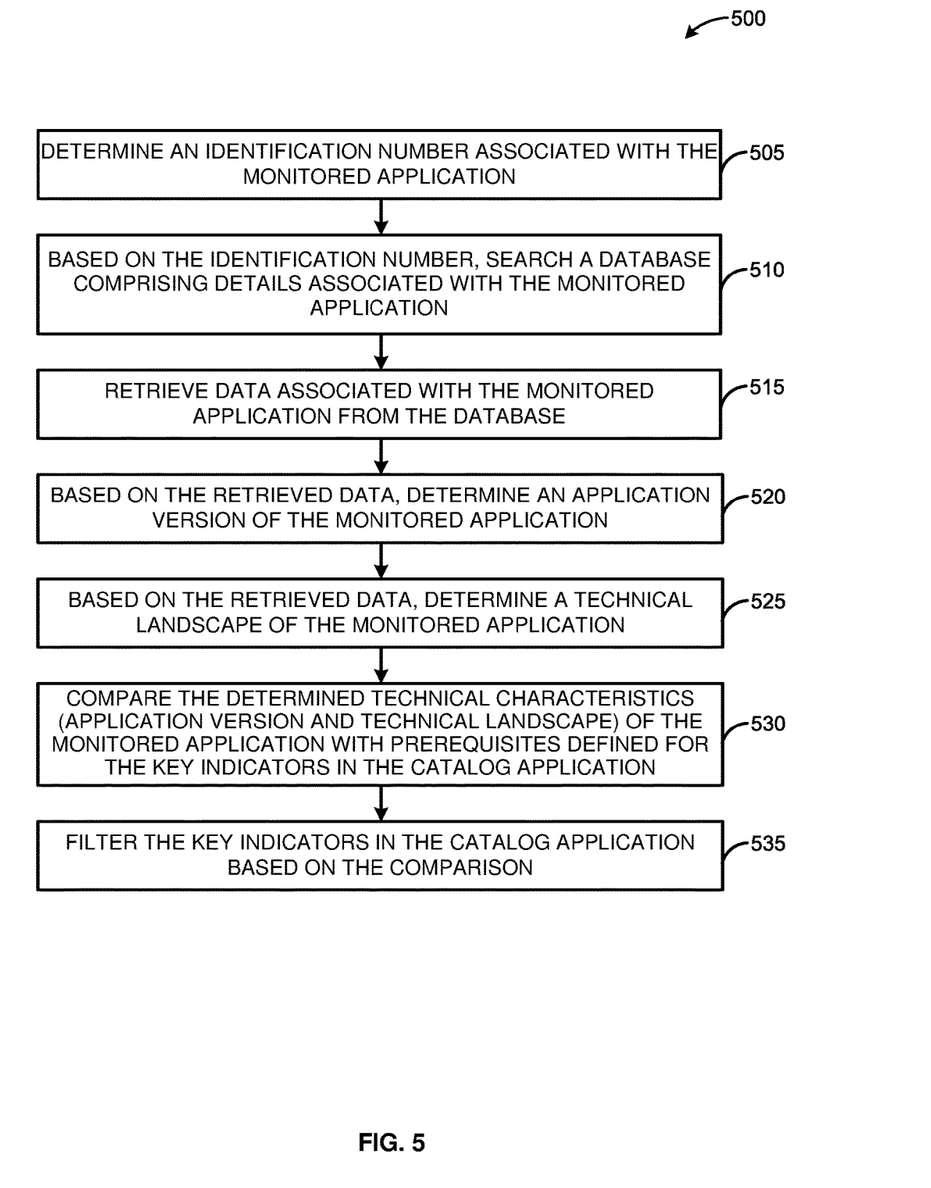
FIG. 5 is a flow diagram illustrating a process for filtering key indicators provided by a catalog application to determine a set of key indicators compatible with a monitored application, according to one embodiment.

FIG. 5 is a flow diagram illustrating a process 500 for filtering key indicators provided by a catalog application to determine a set of key indicators compatible with a monitored application, according to one embodiment. In one embodiment, a request is received at an instantiated service catalog interface to provided data for a key indicator, compatible with a monitored application. The instantiated service catalog interface may be such as the catalog service interface 130, FIG. 1. The request for providing data may be sent by a monitoring application, such as the Application_1 122, FIG. 1. Characteristics of the monitored application are determined based on the received request for providing data for compatible key indicators with the monitored application. The catalog application may maintain data for a number of key indicators that may be applicable and compatible correspondingly with different applications. In addition, a key indicator may be compatible only with a specific version of an application, and another key indicator may be compatible with a different version of the same application. Therefore, data for different key indicators may include data for key indicators' prerequisites associated with versions of applications. For example, a key indicator may be defined to be compatible with two subsequent versions of an application which performance may be measured by a monitoring application. The data stored for the key indicators in the catalog application comprises data for key indicators' prerequisites, based on which a compliance with a measured application may be determined. For example, two different key indicators may be instances of a common key indicator definition defining different configurations for different applications or application versions. The two key indicators may be stored in the catalog application as compatible correspondingly with two subsequent versions of the application. The two different key indicators instances may share a common performance measurement definition, but may require different configuration of measurement based on differences in the two subsequent version of the application.

At 505, an identification number associated with the monitored application may be determined. The identification number may be such as an installation number. The identification number may be generated for the monitored application, when it was installed on a runtime infrastructure. At 510, based on the determined identification number, a database, comprising details associated with the monitored application, is searched. The identification number may be tracked in the database. The database may comprise information related to installed applications, for example, for a given customer, or provided by a given application provider. For example, the tracking of data associated with the monitored application may be accomplished through accessing data maintained by a vendor of the monitored application.

The database storing data related to the identification number of the monitored application may be maintained at a designated storage. The designated storage may include data for the monitored application and for the runtime infrastructure, where the monitored application is installed and executed. Based on the identification number, a set of software components that are part of the monitored application, as it is installed and configured, may be determined. In one embodiment, data maintained for the monitored application may include information about the identification number of the monitored application, and also data about a whole technical landscape, where the monitored application operates and communicates with other software applications running on the same infrastructure.

At 515, data associated with the monitored application is retrieved from the database. At 520, based on the retrieved data, an application version of the monitored application is determined. Also, at 525, based on the retrieved data, a technical landscape for the monitored application is determined. The technical landscape may define the computing infrastructure where the monitored application is running, together with other applications that may run in parallel with the monitored application. The technical landscape may include software and hardware characteristics defined for the monitored application and the other applications running on the computing infrastructure. The technical landscape may also include characteristics of the computing infrastructure, where the monitored application runs.

In one embodiment, the determined application version of the monitored application, and the determined technical landscape of the monitored application are technical characteristics of the monitored application. At 530, the determined technical characteristics of the monitored application are compared with prerequisites defined for the key indicators in the catalog application. At 535, based on the comparison, the key indicators in the catalog application are filtered. As a result from filtering, only key indicators that are compatible with the monitored application are determined.

Figure 6:
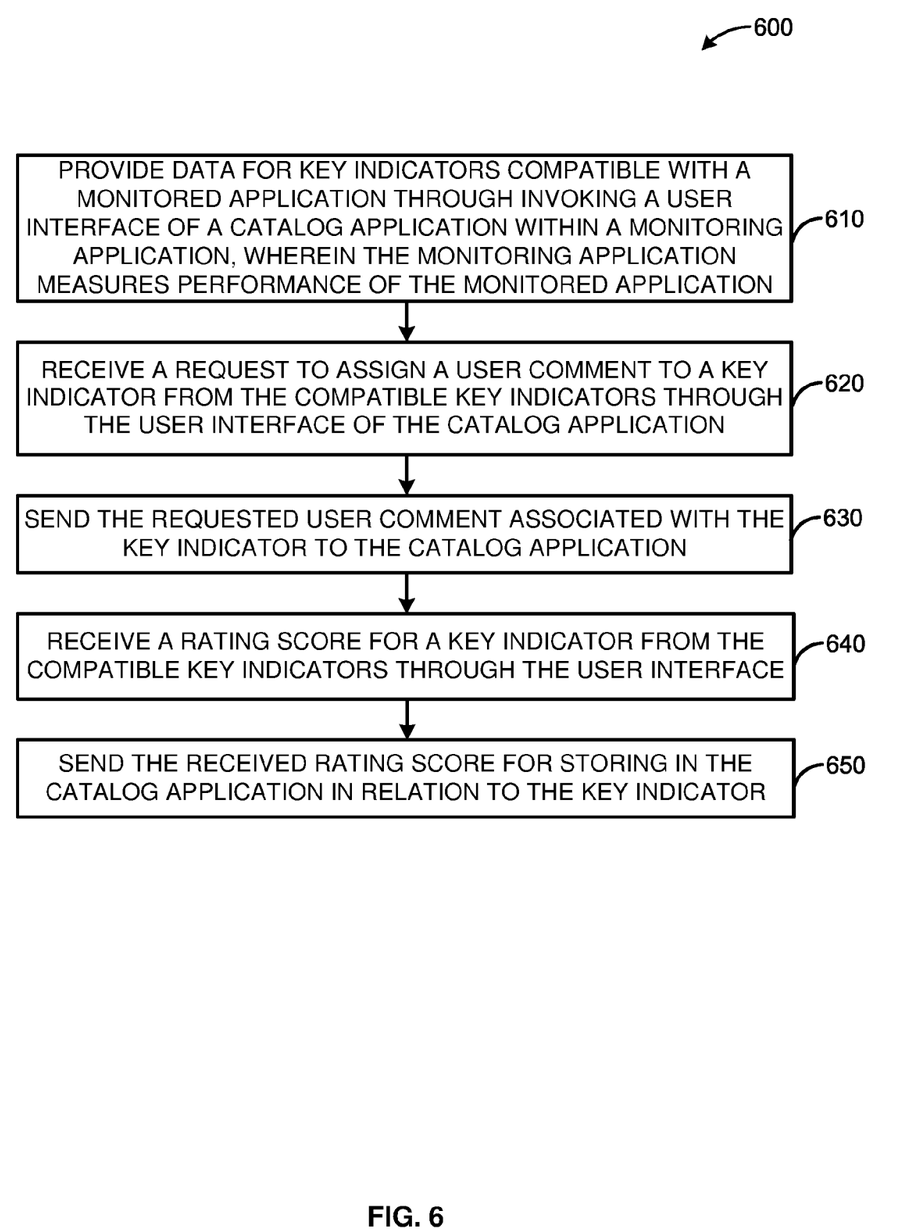
FIG. 6 is a flow diagram illustrating a process for defining user comments and rating scores to a key indicator from a set of key indicators data a catalog application, according to one embodiment.

FIG. 6 is a flow diagram illustrating a process 600 for defining user comments and rating scores to a key indicator from a set of key indicators data a catalog application, according to one embodiment. At 610, data for key indicators are provided. The key indicators are compatible with a monitored application. The data are provided through invoking a user interface of a catalog application within a monitoring application. The monitoring application measures performance of the monitored application. The data for key indicators may be provided in response to a received request, such as the request at an instantiated service interface. The monitored application may be such as the Application X 135, FIG. 1, or the Application Z 140, FIG. 1. The monitoring application may be such as the Application_1 122, FIG. 1. The key indicators compatible with the monitored application are provided on the UI of the monitoring application through invoking the UI of the catalog application. The invoked UI of the catalog application includes requested content from the catalog application.

At 620, a request to add a user comment to a key indicator from the compatible key indicators is received through the invoked UI. The user comment may characterize the key indicator. For example, the user comment may contain feedback to specific aspects of the key indicators, suggestions for improvement, etc. At 630, the requested user comment associated with the key indicator is sent to the catalog application. For example, the communication for sending the user comment to the catalog application is performed by the instantiated service catalog, as discussed above. Based on the request sent at 630, the requested user comment may be evaluated by the catalog application and stored in relation to the key indicator.

At 640, a rating score is received for a key indicator from the determined compatible key indicators through the UI of the catalog application that is displayed within the UI of the monitored application. A rating score may be defined on a rating scale, for example from 1 to 5. The rating score may define how useful the key indicator is for measuring performance of the monitored application. The rating score may be defined by an end user of the monitoring application that utilizes the key indicator through the monitoring application. At 650, the received rating score for the key indicator is sent for storing in the catalog application. The received rating score may be consolidated with other received rating scores for the key indicator. A cumulative rating score may be presented on the UI of the catalog application in relation to providing data for the key indicators. The rating score may be provided on the UI in form of five points of stars, as illustrated in block 335, FIG. 3.

Figure 7:
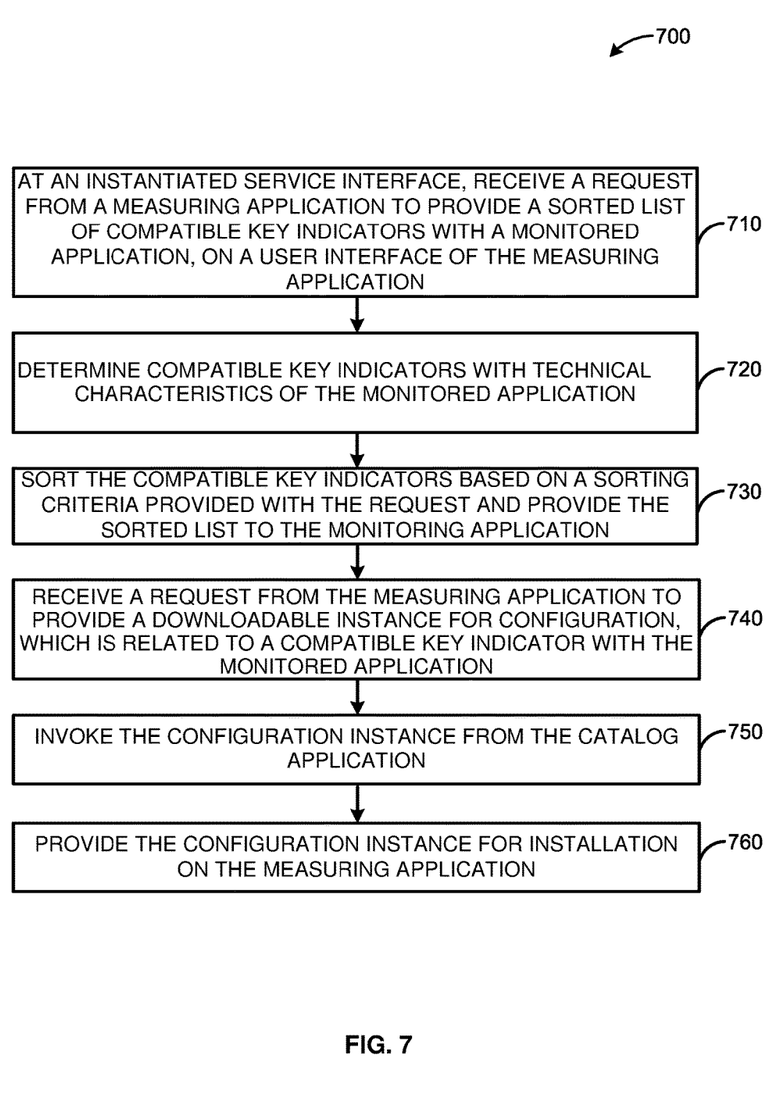
FIG. 7 is a flow diagram illustrating a process for providing configuration instances for measurement of a key indicator based on collected data, according to one embodiment.

FIG. 7 is a flow diagram illustrating a process 700 for providing configuration instances for measurement of a key indicator based on collected data, according to one embodiment. At 710, at an instantiated service interface, a request from a measuring application is received. The instantiated service interface may be such as the catalog service interface 130, FIG. 1. And the measuring application may be such as the Application_1 122, FIG. 1, which may be used to monitor performance of related applications and to perform measurement over applications' performance based on defined rules for measurement in relation to a key indicator. The measuring application may be such as the monitoring application discussed in relation to in FIG. 2 and FIG. 6. The key indicator may be part of a number of key indicators provided by a catalog application, such as the catalog application 145, FIG. 1. The received request at 710, may be for providing a sorted list of compatible key indicators with a monitored application on a UI of the measuring application. The monitored application may be such as the Application X 135, FIG. 1, or the Application Z 140, FIG. 1.

At 720, compatible key indicators are determined. The key indicators are compatible with technical characteristics of the monitored application. The key indicators may be defined together with technical prerequisites, such as the provided example in relation to FIG. 4C. The technical prerequisites of the number of key indicators are matched with characteristics of the monitored application to determine the compatible key indicators. The determining of the compatible key indicator may be such as the described process 500, FIG. 5. At 730, the compatible key indicators are sorted based on a sorting criterion, which may be provided with the request (from 710). The sorting criterion may be defined through a provided UI of the catalog application within the measuring application. The sorting criterion may be defined as suggested on FIG. 3 in the "Sort by" 330 option. The compatible key indicators may be sorted. In one example, the compatible key indicators may be sorted by data of definition, in an order "newest to oldest". At 740, a request to provide a downloadable instance for configuration is received from the measuring application. The downloadable instance is associated with a compatible key indicator from the provided sorted list of compatible key indicators with the monitored application. The downloadable instance may be a configuration instance that comprises metadata and configuring parameters that may be provided to the measuring application. The configuration instance may be used for configuring the measurement of data, stored for the monitored application. The measured data are relevant for performance measurement as defined by the requested compatible key indicator. The configuration instance may be stored in the catalog application. The request to provide the downloadable instance for the compatible key indicator may be evaluated to define access rights and parameters. In one embodiment, the downloadable instance may be provided as a purchase item with a designated price and/or terms and conditions for download and usage. At 750, the configuration instance is invoked from the catalog application. At 760, the configuration instance is provided for installation on the measuring application.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
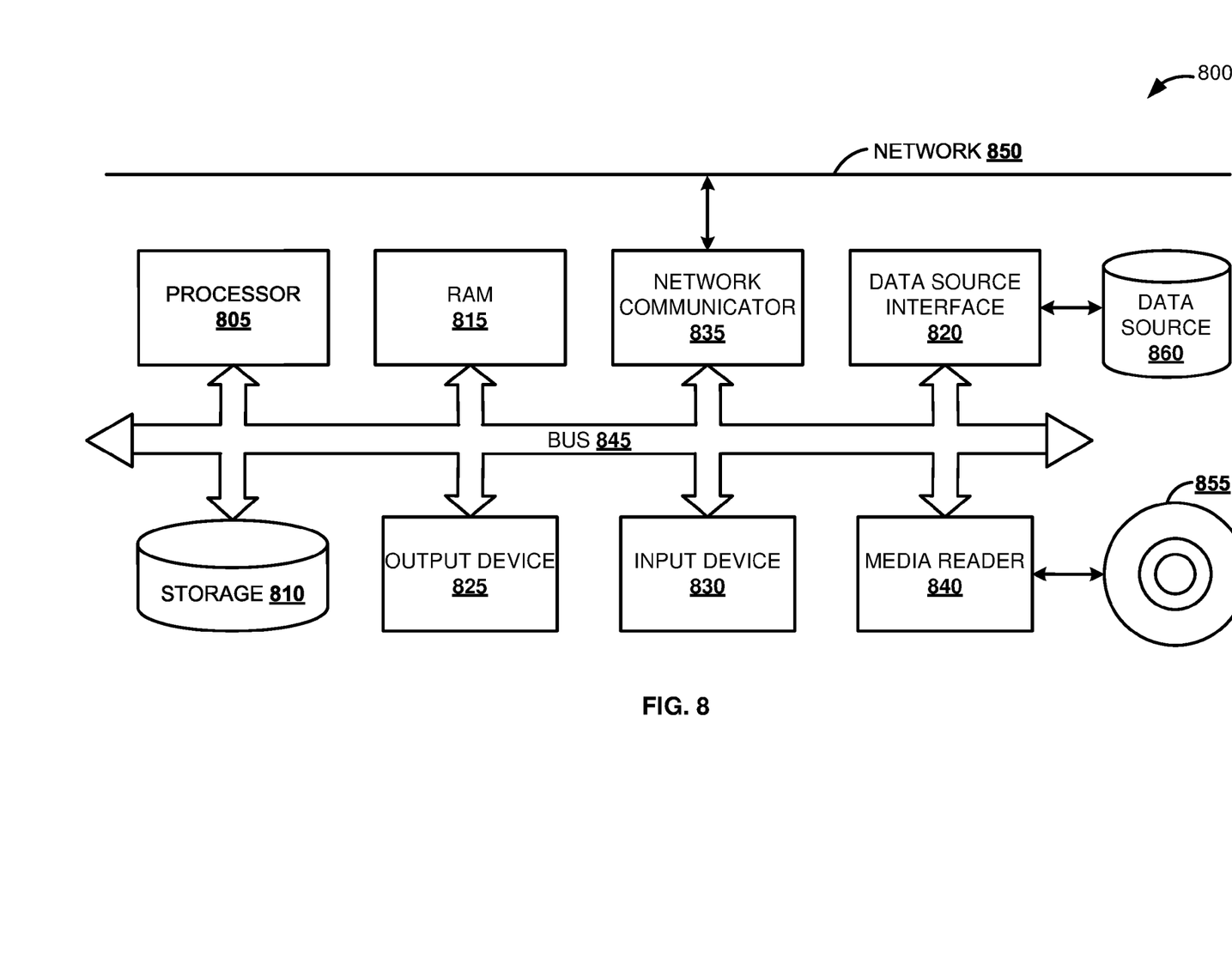
FIG. 8 is a block diagram illustrating an embodiment of a computing environment in which the techniques described for integrating a catalog application into a monitoring application for configuring measurements of key indicators can be implemented.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for performance measurement, the method comprising:
    monitoring one or more applications by a monitoring application, the one or more applications operating on at least one computer platform and the monitoring application operating on a second computer platform in communication with the at least one computer platform across a network;
    installing an instantiation of a catalog application service interface on the second computer platform for processing requests from the monitoring application for information about key indicators available at the catalog application, the catalog application providing data defining different key indicators for measuring performance of at least one of the one or more monitored applications;

the catalog application service interface receiving a request to provide data for one or more key indicators compatible with a first application of the one or more applications;

the catalog application evaluating the request to determine the one or more compatible key indicators based on technical characteristics of the first application; and executing in a second application measurement of the one or more key indicators over performance of the first application;

displaying in a user interface the one or more compatible key indicators determined by the catalog application; and providing in the user interface measurement results of the performance of the first application.

2. The method of claim 1, wherein evaluating the request further comprises:
determining the technical characteristics associated with the first application; and
comparing the determined technical characteristics with prerequisites for the key indicators in the catalog application.

3. The method of claim 1, wherein determining the technical characteristics associated with the first application further comprises:
determining an identification number associated with the first application;
based on the identification number, searching a database comprising installation details determine an application version of the first application from the database; and
determining technical landscape of the first application.

4. The method of claim 3, wherein evaluating the request further comprises:
filtering the key indicators in the catalog application based on the application version and the technical landscape of the first application.

5. The method of claim 1, wherein the data for the one or more compatible key indicators provided in the second application comprises textual descriptions, diagrams, and technical details for configuring the measurement of the one or more key indicators in the second application.

6. The method of claim 1, further comprising:
receiving a request to assign a user comment to a key indicator from the determined one or more compatible key indicators through the user interface of the catalog application; and
sending the requested user comment for assigning to the key indicator to the catalog application.

7. The method of claim 1, further comprising:
receiving a rating score for a key indicator from the determined one or more compatible key indicators through the user interface; and
sending the received rating score for storing in the catalog application in relation to the key indicator.

8. The method of claim 1, further comprising:
receiving a request to provide a sorted list of the one or more compatible key indicators on the user interface based on a sorting criterion; and
sorting the one or more compatible key indicators based on the sorting criterion.

9. The method of claim 1, further comprising:
receiving a request to provide an instance for configuration of a measurement by the second application, wherein the requested instance is related to a compatible key indicator for the first application;

invoking the requested configuration instance for the compatible key indicator from the catalog application; and providing the configuration instance for installation on the second application.

10. A computer system comprising:
a processor;
a memory in association with the processor, the memory storing executable instructions that cause the processor to:
monitor one or more applications by a monitoring application, the one or more applications operating on at least one computer platform and the monitoring application operating on a second computer platform in communication with the at least one computer platform across a network;
install an instantiation of a catalog application service interface on the second computer platform for processing requests from the monitoring application for information about key indicators available at the catalog application, the catalog application providing data defining different key indicators for measuring performance of at least one of the one or more monitored applications;
at the catalog application service interface receive a request to provide data for one or more key indicators compatible with a first application of the one or more applications;
evaluate at the catalog application the request to determine the one or more compatible key indicators based on technical characteristics of the first application;
execute in a second application measurement of the one or more key indicators over performance of the first application;
display in a user interface the one or more compatible key indicators determined by the catalog application; and
provide in the user interface measurement results of the performance of the first application.

11. The system of claim 10, wherein the instructions to evaluate the request further comprise instructions to:
determine the technical characteristics associated with the first application;
compare the determined technical characteristics with prerequisites for the key indicators in the catalog application; and
filter the key indicators in the catalog application based on the comparison to determine the one or more compatible key indicators from the key indicators from the catalog application.

12. The system of claim 11, wherein the instructions to determine the technical characteristics associated with the first application further comprise instructions to:
determine an identification number associated with the first application;
based on the identification number, search a database comprising installation details determine an application version of the first application from the database; and
determine technical landscape of the first application.

13. The system of claim 10, further comprising instructions to:

receive a request to assign a user comment to a key indicator from the determined one or more compatible key indicators through the user interface of the catalog application; and send the requested user comment for assigning to the key indicator to the catalog application.

14. The system of claim 10, further comprising instructions to:

receive a rating score for a key indicator from the determined one or more compatible key indicators through the user interface; and send the received rating score for storing in the catalog application in relation to the key indicator.

15. The system of claim 10, further comprising instructions to:

receive a request to provide a sorted list of the one or more compatible key indicators on the user interface based on a sorting criterion;

sort the one or more compatible key indicators based on the sorting criterion;

receive a request to provide an instance for configuration of a measurement by the second application, wherein the requested instance is related to a compatible key indicator for the first application;

invoke the requested configuration instance for the compatible key indicator from the catalog application; and provide the configuration instance for installation on the second application.

16. A non-transitory computer-readable medium storing executable instructions, which when executed by a processor cause the processor to:

monitor one or more applications by a monitoring application, the one or more applications operating on at least one computer platform and the monitoring application operating on a second computer platform in communication with the at least one computer platform across a network;

install an instantiation of a catalog application service interface on the second computer platform for processing requests from the monitoring application for information about key indicators available at the catalog application, the catalog application providing data defining different key indicators for measuring performance of at least one of the one or more monitored applications;

at the catalog application service interface receive a request to provide data for one or more key indicators compatible with a first application of the one or more applications;

evaluate at the catalog application the request to determine the one or more compatible key indicators based on technical characteristics of the first application;

execute in a second application measurement of the one or more key indicators over performance of the first application;

display in a user interface the one or more compatible key indicators determined by the catalog application; and provide in the user interface measurement results of the performance of the first application.

17. The computer-readable medium of claim 16, wherein the instructions to evaluate the request to determine the one or more compatible key indicators further comprise instructions to:

determine the technical characteristics associated with the first application, wherein the technical characteristics comprise an application version of the first application and a technical landscape of the first application;

compare the determined technical characteristics with prerequisites for the key indicators in the catalog application; and filter the key indicators in the catalog application based on the application version and the technical landscape of the first application.

18. The computer-readable medium of claim 16, further storing instructions to:

receive a request to assign a user comment to a key indicator from the determined one or more compatible key indicators through the user interface of the catalog application; and send the requested user comment for assigning to the key indicator to the catalog application.

19. The computer-readable medium of claim 16, further storing instructions to:

receive a request to provide a sorted list of the one or more compatible key indicators on the user interface based on a sorting criterion; and sort the one or more compatible key indicators based on the sorting criterion.

20. The computer-readable medium of claim 16, further storing instructions to:

receive a request to provide an instance for configuration of a measurement by the second application, wherein the requested instance is related to a compatible key indicator for the first application;

invoke the requested configuration instance for the compatible key indicator from the catalog application; and provide the configuration instance for installation on the second application.

* * * * *